United States Patent
Maille et al.

(10) Patent No.: US 10,723,658 B2
(45) Date of Patent: Jul. 28, 2020

(54) METHOD OF FABRICATING A CERAMIC FROM A CHEMICAL REACTION

(71) Applicants: SAFRAN CERAMICS, Le Haillan (FR); CENTRE NATIONAL DE LA RECHERCHE SCIENTIFIQUE, Paris (FR)

(72) Inventors: Laurence Maille, Pessac (FR); Jérôme Roger, Pessac (FR); Yann Le Petitcorps, Leognan (FR); Bernard Reignier, Pompignac (FR)

(73) Assignees: CENTRE NATIONAL DE LA RECHERCHE SCIENTIFIQUE, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 16/064,544

(22) PCT Filed: Dec. 20, 2016

(86) PCT No.: PCT/FR2016/053563
§ 371 (c)(1),
(2) Date: Jun. 21, 2018

(87) PCT Pub. No.: WO2017/109373
PCT Pub. Date: Jun. 29, 2017

(65) Prior Publication Data
US 2018/0370859 A1  Dec. 27, 2018

(30) Foreign Application Priority Data
Dec. 21, 2015 (FR) ...................................... 15 62929

(51) Int. Cl.
C04B 35/58     (2006.01)
C04B 35/591    (2006.01)
(Continued)

(52) U.S. Cl.
CPC .... *C04B 35/58014* (2013.01); *C04B 35/5615* (2013.01); *C04B 35/573* (2013.01);
(Continued)

(58) Field of Classification Search
CPC ............ C04B 35/58014; C04B 35/645; C04B 35/573; C04B 35/5615; C04B 35/806;
(Continued)

(56) References Cited

U.S. PATENT DOCUMENTS

| 5,378,417 A | 1/1995 | Yasutomi et al. |
| 10,011,902 B1 | 7/2018 | Philippe et al. |

FOREIGN PATENT DOCUMENTS

| EP | 0 675 091 A1 | 10/1995 |
| FR | 2 784 695 A1 | 4/2000 |

(Continued)

OTHER PUBLICATIONS

Jérôme Roger, L Maillé, Marie-Anne Dourges. Isothermal nitridation kinetics of TiSi2 powders. Journal of Solid State Chemistry, Elsevier, 2014, 212, pp. 134-140.*
(Continued)

*Primary Examiner* — Noah S Wiese
(74) *Attorney, Agent, or Firm* — Pillsbury Winthrop Shaw Pittman LLP (57) ABSTRACT

A method of fabricating a ceramic material, the method including forming a ceramic material by performing a first chemical reaction at least between a first powder of an intermetallic compound and a reactive gas phase, a liquid phase being present around the grains of the first powder during the first chemical reaction, the liquid gas phase being obtained from a second powder of a metallic compound by melting the second powder or as a result of a second chemical reaction between at least one element of the first powder and at least one metallic element of the second
(Continued)

powder, a working temperature being imposed during the formation of the ceramic material, which temperature is low enough to avoid melting the first powder.

15 Claims, 6 Drawing Sheets (51) Int. Cl.
    *C04B 35/622* (2006.01)
    *C04B 35/80* (2006.01)
    *C04B 35/628* (2006.01)
    *C04B 35/56* (2006.01)
    *C04B 35/573* (2006.01)
    *F01D 5/28* (2006.01)
    *C04B 35/645* (2006.01)

(52) U.S. Cl.
    CPC .. *C04B 35/58007* (2013.01); *C04B 35/58028* (2013.01); *C04B 35/591* (2013.01); *C04B 35/62222* (2013.01); *C04B 35/62842* (2013.01); *C04B 35/62863* (2013.01); *C04B 35/62868* (2013.01); *C04B 35/62873* (2013.01); *C04B 35/645* (2013.01); *C04B 35/806* (2013.01); *F01D 5/284* (2013.01); *C04B 2235/3891* (2013.01); *C04B 2235/402* (2013.01); *C04B 2235/405* (2013.01); *C04B 2235/46* (2013.01); *C04B 2235/465* (2013.01); *C04B 2235/524* (2013.01); *C04B 2235/5244* (2013.01); *C04B 2235/5248* (2013.01); *C04B 2235/5445* (2013.01); *C04B 2235/5454* (2013.01); *C04B 2235/614* (2013.01); *C04B 2235/616* (2013.01); *C04B 2235/72* (2013.01); *C04B 2235/728* (2013.01); *C04B 2235/80* (2013.01); *F05D 2300/177* (2013.01); *F05D 2300/6033* (2013.01)

(58) Field of Classification Search
CPC ............ C04B 35/62222; C04B 35/591; C04B 2235/614; C04B 2235/46
See application file for complete search history.

(56) References Cited

FOREIGN PATENT DOCUMENTS

| FR | 2 988 777 A1 | 10/2013 |
|---|---|---|
| GB | 1 028 977 A | 5/1966 |
| JP | H05-330921 A | 12/1993 |
| JP | H06-248414 A | 9/1994 |
| JP | H07-268249 A | 10/1995 |
| RU | 2239613 C1 | 11/2004 |
| RU | 2 382 690 C1 | 2/2010 |
| RU | 2490232 C1 | 8/2013 |
| WO | WO 98/022244 | 5/1998 |
| WO | WO 2015/011371 | 1/2015 |

OTHER PUBLICATIONS

Lin et al. Comparative Studies of Metal Additives on the Nitridation of Silicon. Journal of the American Ceramic Society, 60—Jan. 1977.*

Magnant, J., et al., "Carbon fiber/reaction-bonded carbide matrix for composite materials—Manufacture and characterization", Journal of the European Ceramic Society 32 (16) 2012, pp. 4497-4505.

Tang, S. F., et al., "Ablation behaviors of ultra-high temperature ceramic composites," Materials Science and Engineering A 465 (2007) pp. 1-7.

Sugiyama, K., et al., "Consolidation of $Si_3N_4$ powder-preform by infiltration of BN using the pulse CVI process" Journal of Materials and Science Letters 7 (1988) pp. 1221-1224.

Greil, P., "Near Net Shape Manufacturing of Polymer Derived Ceramics," Journal of the European Ceramic Society 18 (1998), pp. 1905-1914.

Le Ber, S., et al., Matrices nanostructurées élaborées par voie liquide: application aux composites à matrice céramique [Nanostructured matrices prepared by a liquid technique: application to ceramic matrix composites], Thesis 4323 Université Bordeaux 1, 2011 (English abstract on p. 238 of document), 238 pages.

Maillé, L., et al., "Study of the nitridation process of $TiSi_2$ powder", Applied Surface Science 260 (2012), pp. 29-31.

International Search Report as issued in International Patent Application No. PCT/FR2016/053563, dated Apr. 12, 2017.

Roger, J., et al., "Isothermal nitridation kinetics of TiSi2 powders," Journal of Solid State Chemistry, vol. 212, Apr. 2014, XP055165522, pp. 134-140.

Ade, M., et al., "Electroconductive ceramic composites with low-to-zero shrinkage during sintering," Journal of the European Ceramic Society, vol. 23, No. 11, Oct. 2003, XP004424295, pp. 1979-1986.

Maillé, L., et al., "Manufacturing of ceramic matrix composite using a hybrid Process Combining TiSi2 active filler infiltration and preceramic impregnation and pyrolysis," Journal of the European Ceramic Society, vol. 34, No. 2, Feb. 2014, XP055164766, pp. 189-195.

Database WPI, Week 199440, XP002768861, 2017 Clarivate Analytics.

* cited by examiner

METHOD OF FABRICATING A CERAMIC FROM A CHEMICAL REACTION

CROSS REFERENCE TO RELATED APPLICATIONS

This application is the U.S. National Stage of PCT/FR2016/053563 filed Dec. 20, 2016, which in turn claims priority to French Application No. 1562929, filed Dec. 21, 2015. The contents of both applications are incorporated herein by reference in their entirety.

BACKGROUND OF THE INVENTION

The invention relates to methods of fabricating ceramic materials and also to products that can be obtained by performing such methods.

Chemical vapor infiltration (CVI) methods are known for densifying fiber preforms. Methods of that type consist in infiltrating a gas mixture containing all of the elements for forming the material within a porous preform in order to densify the preform. By way of example, that type of method is described in application FR 2 784 695. Chemical vapor infiltration is derived from the technique of chemical vapor deposition (CVD) and it possesses a deposition rate that is constant over time. It is a method that gives good properties to the material. Nevertheless, in order to obtain a ceramic matrix composite (CMC) that is uniform, while avoiding premature clogging at the periphery of the preform, it can be necessary to operate at low pressure and at relatively low temperature ($\leq 1100°$ C.) in order to slow down growth rates. This leads to fabrication durations for CMC parts that are long and makes the method expensive. Machining may be needed in order to reopen the pores at the periphery so as to give the gases access to the core. Nevertheless, matrix densification may be stopped once the porosity has reached a value close to 10% to 15%, because of the presence of macropores.

Also known is the slurry or ceramic or sol-gel technique, which consists in impregnating fiber preforms with a slurry or a sol (a mixture of ceramic particles of sub-micrometer dimensions, sintering additives, and liquid solvents) followed by drying and sintering the whole at $1600°$ C. to $1800°$ C. under pressure. By way of example, such a method is described in EP 0 675 091 and in the publication by J. Magnant, L. Maillé, R. Pailler, J-C. Ichard, A. Guette, F. Rebillat, and E. Philippe entitled "Carbon fiber/reaction-bonded carbide matrix for composite materials—Manufacture and characterization", published in J. Europ. Ceram. Soc. 32 (16) 2012, pp. 4497-4505. Nevertheless, preparing carbon xerogels can involve using substances classified as CMR (carcinogenic, mutagenic, or toxic for reproduction), which can make industrial production difficult.

The various known techniques may either be used independently, or else they may be combined with one another in order to form hybrid methods. Various examples of hybrid methods are described below.

Slurry and CVI hybrid methods are known that combine the slurry technique (without sintering additives) with the gaseous technique. After impregnating the fiber preform with the slurry, the matrix can subsequently be densified by conventional CVI using green composite. Nevertheless, the great compactness of an agglomerated (sub)micrometer powder constitutes a brake to good infiltration. The core of the material densifies poorly because of the premature closure of the pores at the periphery of the material. Reactive species find it difficult to penetrate into the small pores and their concentration drops off very quickly going from the periphery to the core, thereby greatly slowing down and then preventing growth of the consolidation layer. Tang et al. (S. F. Tang, J. Y. Deng, S. J. Wang, W. C. Liu, K. Yang "Ablation behaviors of ultra-high temperature ceramic composites" Materials Science and Engineering A 465 (2007) pp. 1-7) have nevertheless made composites from green compacts of micrometer powders of $ZrB_2$, SiC, HfC, and TaC consolidated by pyrolytic carbon CVI. Under such circumstances, the continuous matrix phase is made of pyrolytic carbon. By replacing conventional CVI with pulsed CVI, it is possible to consolidate micrometer powders (4 micrometers ($\mu m$) to 5 $\mu m$) forming a green compact of millimeter thickness (N. K. Sugiyama and Y. Ohsawa "Consolidation of $Si_3N_4$ powder-preform by infiltration of BN using the pulse CVI process" Journal of Materials and Science Letters 7 (1988) pp. 1221-1224). Purging and filling the green compacts makes it possible periodically to reduce the natural concentration gradient of the gaseous species between the core and the periphery. However feasibility has not been reported for sub-micrometer powders, and the method appears to be difficult to industrialize.

A pre-ceramic slurry and resin hybrid method makes it possible to prepare a matrix from an impregnated powder and a pre-ceramic resin (Peter Greil, Net shape manufacturing of polymer derived ceramics, J. Europ. Ceram. Soc. 18 1998, pp. 1905-1914). The increase in the volume of the powder makes it possible to compensate in part for the shrinkage in volume of the resin during pyrolysis.

Work has recently been carried out (Matrices nanostructurées élaborées par voie liquide: application aux composites à matrice céramique [Nanostructured matrices prepared by a liquid technique: application to ceramic matrix composites], Thesis 4323 Université Bordeaux 1, 2011, and L. Maillé, M. A. Dourges, S. Le Ber, P. Weisbecker, F. Teyssandier, Y. Le Petitcorps, R. Pailler, "Study of the nitridation process of $TiSi_2$ powder", Applied Surface Science 260 (2012), pp. 29-31) for preparing a matrix by volume expansion by causing a powder that is impregnated within the preform to react with a gas. The system that has been studied until now is nitriding a $TiSi_2$ powder with dinitrogen at normal pressure, leading to one of the greatest volume increases, of the order of 60%. In that work, the objective was to prepare a low cost matrix by using Nicalon® fibers that are unstable above $1100°$ C., and during nitriding a treatment temperature was used that was less than or equal to $1100°$ C. That work has shown that under such conditions, nitriding of the powder is relatively slow and incomplete. The problem relates to nitriding silicon because of a slow conversion rate.

There therefore exists a need to have novel methods of fabricating ceramic materials at low cost that are suitable for use on an industrial scale and in which it is possible to make use of a treatment temperature that is relatively low.

In particular, there is a need to have novel methods of densifying fiber preforms that can be used on an industrial scale and that present a cost and a working temperature that are relatively low.

There also exists a need to have novel methods of fabricating ceramic materials at low cost in which the chemical reaction used is complete.

There also exists a need to have novel methods of fabricating ceramic materials in which the materials obtained are substantially free of residual free silicon.

There also exists a need to have novel ceramic materials that present mechanical properties that are very satisfactory and a microstructure that is uniform.

OBJECT AND SUMMARY OF THE INVENTION

To this end, in a first aspect, the invention provides a method of fabricating a ceramic material, the method comprising the following steps:

forming a ceramic material by performing a first chemical reaction at least between a first powder of a metallic disilicide and a reactive gas phase, a liquid phase obtained from a second powder being present around the grains of the first powder during the first chemical reaction, a working temperature, being imposed during the formation of the ceramic material, which temperature is low enough to avoid melting the first powder, and one of the two following characteristics being true:

the second powder is a powder of nickel and the liquid phase is obtained as a result of a second chemical reaction between at least one element of the first powder and the nickel of the second powder; or the second powder is a powder of an alloy of aluminum and of silicon and the liquid phase is obtained by melting by said alloy of aluminum and of silicon.

A metallic disilicide is a compound having the chemical formula $MSi_2$ where M is a metallic element, where M may for example be a transition metal. By way of example, the first powder may be a powder of $TiSi_2$, a powder of $CrSi_2$, a powder of $ZrSi_2$, or a powder of $VSi_2$.

In the invention, the second powder promotes the reaction between the reactive gas phase and the first powder. During the first chemical reaction, the first powder expands in volume by forming one or more new phases (nitrides, oxides, carbides, . . . ), thereby generating the ceramic material. The use of a second powder in accordance with the invention serving to obtain the liquid phase during the first chemical reaction serves advantageously to accelerate the rate of the first chemical reaction by promoting greater diffusion of the reagent and consequently promoting rapid crystal growth of the reaction product. The use of such a second powder constitutes a tactic serving to accelerate the first chemical reaction in spite of using a working temperature that is relatively low. This serves advantageously to provide a method of fabricating a ceramic material that presents low cost of performance, while enabling a chemical reaction to be carried out relatively quickly. In addition, the invention can advantageously serve to form one or more thermally stable phases and to obtain a chemical reaction that is complete. Furthermore, the ceramic material that is formed need not present any particulate reinforcement dispersed within it.

When the liquid phase is formed by melting an alloy of aluminum and of silicon, said alloy of aluminum and of silicon is selected in such a manner as to present a melting temperature that is low enough to form a liquid phase at the working temperature. For this purpose, once the working temperature and the chemical natures of the first powder and of the reactive gas phase have been selected, it suffices to select an alloy of aluminum and of silicon having a melting temperature that is low enough to obtain a liquid phase during the first chemical reaction. By way of example, such an implementation may correspond to the $ZrSi_2$ and AS13 alloy system described in detail below. When the liquid phase is formed by melting an alloy of aluminum and of silicon, said alloy may melt during the treatment of the first powder with the reactive gas phase or during preliminary heat treatment performed prior to starting the first chemical reaction.

When the liquid phase is formed as a result of the second chemical reaction, there may be a chemical reaction directly between the first powder and the second powder of nickel. Under such circumstances, a mixture comprising the first powder and the second powder of nickel is obtained prior to the first chemical reaction. In a variant, the second powder of nickel is initially melted so as to form molten nickel, and then the first powder is impregnated by the molten nickel so as to perform the second chemical reaction and form the liquid phase.

When the liquid phase is formed as a result of the second chemical reaction, the liquid phase includes at least one element of the first powder and nickel. Under such circumstances, the liquid phase may be obtained as a result of a chemical reaction between at least the silicon of the first powder and the nickel of the second powder. Under such circumstances, the liquid phase may include at least nickel and silicon. The liquid phase may also be obtained as a result of a chemical reaction between the silicon of the first powder, the metallic element M of the first powder, and the nickel of the second powder. Under such circumstances, the liquid phase may include at least nickel, the metallic element M, and silicon. For example, for the system corresponding to a first powder of $TiSi_2$ and a second powder of nickel, the liquid phase includes at least silicon, nickel, and titanium.

Figure 1:
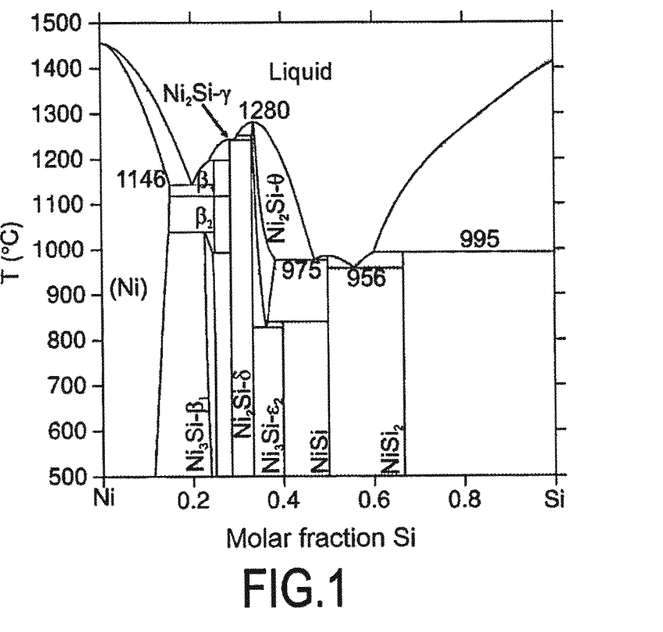
FIG. 1 is the binary phase diagram of the Ni—Si system.
Figure 2:
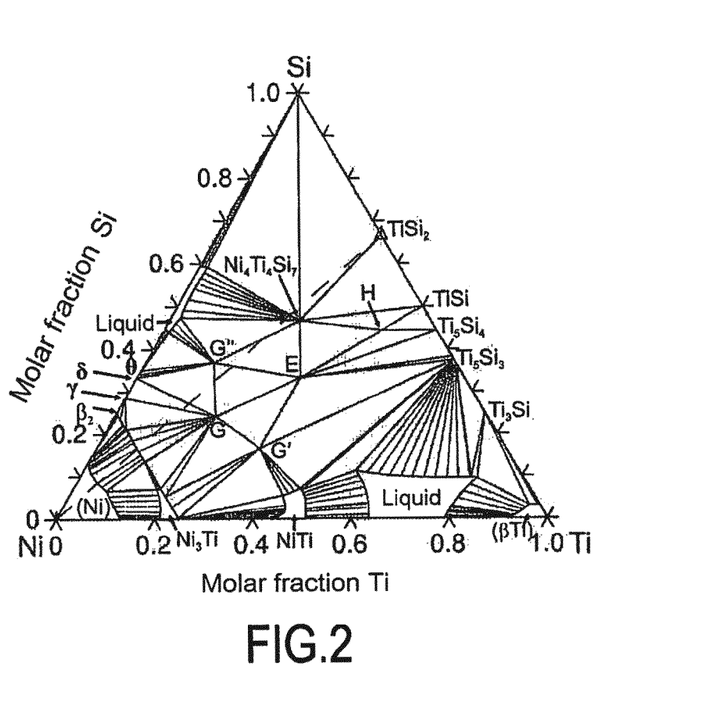
FIG. 2 is the ternary phase diagram at 1100° C. of the Ni—Si—Ti system.

When the liquid phase is formed as a result of the second chemical reaction, the nickel constituting the second powder, when associated with at least one other element of the first powder, forms a system having a phase diagram showing the formation of a liquid phase at the working temperature. For example, for the system corresponding to a first powder of $TiSi_2$ and a second powder of nickel, the binary phase diagram of the Ni—Si system shows the formation of a liquid phase as form 956° C. (see FIG. 1) and the ternary phase diagram of the Ni—Ti—Si system at 1100° C. also shows the possibility of forming a liquid phase (see FIG. 2). Thus, by way of example at a working temperature of 1100° C., it is possible to use a second powder of nickel with a first powder of $TiSi_2$ and thus obtain the presence of the liquid phase during the first chemical reaction. The phase diagrams thus make it possible for each system of interest to identify the relative contents of constituents needed to obtain the liquid phase when it is formed as a result of the second chemical reaction.

When the liquid phase is formed as a result of the second chemical reaction, the nickel of the second powder, when associated with silicon, may form a system for which the phase diagram shows the formation of a liquid phase at the working temperature.

When the liquid phase is formed as a result of the second chemical reaction, the nickel of the second powder, when associated with the metallic element of the first powder, may form a system for which the phase diagram shows the formation of a liquid phase at the working temperature.

Preferably, the first powder may be a powder of $TiSi_2$ and the second powder may be a powder of nickel. In this system, the liquid phase is obtained as a result of performing the second chemical reaction.

Such a system is particularly advantageous because of the existence of a low melting point within the Ni—Si system, as explained above. In addition, the system can advantageously make it possible to obtain conversion that is total and a ceramic material that presents mechanical properties that are satisfactory, in association with a microstructure that is uniform. In addition, the reaction of the first powder and of the reactive gas phase is advantageously facilitated by using a second powder of nickel, which serves to obtain a silicon-rich liquid phase around the grains, thereby assisting diffusion of the reactive species.

By way of example, the reactive gas phase employed in the system may include the element N, e.g. may comprise $N_2$. This obtains a material comprising essentially (i.e. comprising more than 90% by weight): TiN, $Si_3N_4$, and $Ni_4Ti_4Si_7$. The gain in volume as a result of the first chemical reaction may be greater than or equal to 40%, e.g. may be about 50%. Furthermore, forming the $Ni_4Ti_4Si_7$ compound is advantageous insofar as this compound is a refractory compound and anti-oxidant.

In an implementation, the quantity of material of the first powder, prior to starting the first chemical reaction, may be greater than the quantity of material of the second powder.

The term "quantity of material" is used to mean the quantity of material when measured in moles (mol).

This characteristic means that before starting the first chemical reaction, the first powder is present at an atomic fraction that is greater than the atomic fraction of the second powder.

Before starting the first chemical reaction, the following may apply:
- the ratio of (the quantity of material of the first powder) divided by (the quantity of material of the first powder plus the quantity of material of the second powder) is greater than 82.51% and less than 92.5%; and
- the ratio of (the quantity of material of the second powder) divided by (the quantity of material of the first powder plus the quantity of material of the second powder) is greater than 7.5% and less than 17.5%.

The ratio of (the quantity of material of the first powder) divided by (the quantity of material of the first powder plus the quantity of material of the second powder) prior to starting the first chemical reaction may lie in the range 85% to 90%.

The ratio of (the quantity of material of the second powder) divided by (the quantity of material of the first powder plus the quantity of material of the second powder) prior to starting the first chemical reaction may lie in the range 10% to 15%.

Such ratios concerning the quantities of the first and second powders used may be valid in particular when the first powder is a powder of $TiSi_2$ and the second powder is a powder of nickel.

In a variant, the first powder may be a powder of $CrSi_2$ and the second powder may be a powder of nickel. In variant, the first powder may be a powder of $VSi_2$ and the second powder may be a powder of nickel. In these two systems, the liquid phase is obtained as a result of performing the second chemical reaction.

The reactive gas phase used in these latter two systems may for example include the element N or the element C, the gas phase possibly comprising $N_2$ or $CH_4$, for example.

In an implementation, the second powder may be a powder of an AlSi13 alloy (an alloy of aluminum and of silicon having substantially 13% by weight of silicon).

Preferably, the first powder may be a powder of $ZrSi_2$ and the second powder may be a powder of an alloy of aluminum and of silicon, and under such circumstances the second powder may be a powder of an AS13 alloy (AlSi13), for example.

This system serves advantageously to obtain conversion that is total, and a ceramic material presenting mechanical properties that are satisfactory together with a microstructure that is uniform. In addition, the reaction of the first powder with the reactive gas phase is advantageously facilitated by using the second powder of AS13 alloy, which serves to obtain the liquid phase around the grains, thereby assisting diffusion of the reactive species.

As mentioned above, when the first powder is a powder of $ZrSi_2$ and the second powder is a powder of AS13 alloy, the liquid phase is formed by melting the AS13 alloy. The AS13 alloy presents a melting point of 577° C.

The reactive gas phase used in this system may comprise the element N, e.g. $N_2$, for example.

In a variant, the first powder may be a powder of $VSi_2$ and the second powder may be a powder of AS13 alloy. Under such circumstances, the liquid phase is also formed by melting the AS13 alloy.

The reactive gas phase used in the system may include the element N or the element C, with the gas phase possibly comprising $N_2$ or $CH_4$, for example.

As mentioned above, the reactive gas phase may include the element N or the element C. When the gas phase includes the element N, the first chemical reaction is a nitriding reaction. When the gas phase includes the element C, the first chemical reaction is a carburizing reaction. In an implementation, the reactive gas phase may comprise at least one of the following gases: $NH_3$, $N_2$, $O_2$, a gaseous hydrocarbon, e.g. $CH_4$, or tetramethylsilane ($Si(CH_3)_4$). The gaseous hydrocarbon and tetramethylsilane can serve to perform carburization.

Advantageously, the ceramic material that is formed may present a content by weight of residual free carbon that is less than or equal to 1%.

This 1% threshold corresponds to the threshold below which residual free silicon cannot be detected in the ceramic material by X-ray diffraction (XRD).

In an implementation, the working temperature may be less than or equal to 1150° C., or indeed 1100° C. Using such temperature values can be advantageous, e.g. when it is desired to form a ceramic matrix by performing a method of the invention and the fiber reinforcement includes Si—C—O fibers, such as Nicalon® fibers, where such temperatures avoid degrading those fibers. Nevertheless, the invention is not limited to being performed with such working temperature values.

In an embodiment, the first chemical reaction may be performed at a pressure lying in the range 3 millibars (mbar) to 10 bar. This pressure may for example lie in the range 3 mbar and normal pressure (1.01325 bar), or in a variant it may lie in the range normal pressure to 10 bar.

In an embodiment, in particular when it is desirable to form a ceramic matrix by performing the method of the invention, the mean size of the grains in each of the first and second powders used may be less than or equal to 1 μm.

Unless specified to the contrary, the term "mean size" is used to mean the dimension given by the half-population statistical grain size distribution, known as D50.

The present invention also provides a method of fabricating a ceramic matrix composite material part, the method including the following step:
- forming a ceramic matrix in the pores of a fiber preform, the ceramic matrix being formed by performing a method as described above. The ceramic matrix is then formed as the result of first chemical reaction.

Under such circumstances, performing the invention is particularly advantageous insofar as it makes it possible to prepare the ceramic matrix at a temperature that is relatively low (e.g. less or equal to 1100° C.) and thus to have available a method that does not damage the fibers of the fiber reinforcement, nor the interphase coating, if one is present, while also filling the pores of said fiber reinforcement as a result of performing a chemical reaction that is expansive. It is thus possible advantageously to obtain a ceramic matrix composite material presenting porosity that is very low. In addition, when the invention is performed to form a ceramic matrix, it serves advantageously to prepare a matrix that is dense and uniform, e.g. made of nitride, carbide, boride, or oxide, by performing a method of cost that is relatively low.

In an implementation, the fiber preform may include a plurality of ceramic fibers and/or of carbon fibers.

The ceramic fibers may include fibers of nitride type, fibers of carbide type, e.g. silicon carbide fibers, fibers of oxide type, or mixtures of such fibers. By way of example, silicon carbide fibers may include oxygen and be Si—C—O fibers.

In an implementation, the fibers of the fiber preform may be coated in an interphase coating.

The interphase coating may include, and in particular may consist of: pyrolytic carbon (PyC), BC, or BN.

Nevertheless, the invention is not limited to forming a ceramic matrix in the pores of a fiber preform.

Specifically, the present invention also provides a method of fabricating a part coated on its surface by a ceramic material coating, the method including a step of forming said coating on the surface of the part by performing a method as described above. Under such circumstances, the coating is formed as a result of the first chemical reaction.

Under such circumstances, the part may be made of composite material, e.g. of ceramic matrix composite material.

The coating as obtained in this way may form an environmental barrier serving for example to protect the part against oxidizing. The coating may also form a thermal barrier or a smoothing coating that serves to smooth the surface of the underlying part.

The present invention also provides a method of fabricating a block of ceramic material, the method including a step of forming said block by performing a method as described above. The block is thus formed as a result of the first chemical reaction. The block formed in this way may be of any shape.

The present invention also provides a method of fabricating a turbomachine including a step of fabricating a turbomachine element at least by performing a method as described above followed by a step of assembling said element as fabricated in that way with one or more other elements in order to obtain the turbomachine.

Such a turbomachine may form an integral portion of an aeroengine. By way of example, the above-specified turbomachine element may constitute a turbomachine afterbody, e.g. an aeroengine after-body.

The present invention also provides a ceramic material essentially comprising TiN, $Si_3N_4$, and $Ni_4Ti_4Si_7$, and presenting a weight content of residual free silicon less than or equal to 1%.

This material may be obtained by performing a method as described above.

The present invention also provides a ceramic matrix composite material part comprising:
  fiber reinforcement; and
  a matrix present in the pores of the fiber reinforcement, the matrix comprising a ceramic material as defined above.

The present invention also provides a turbomachine including such a ceramic material and/or such a ceramic matrix composite part.

The present invention also provides an aeroengine including such a ceramic material and/or such a ceramic matrix composite part.

BRIEF DESCRIPTION OF THE DRAWINGS

Other characteristics and advantages appear from the following description given with reference to the accompanying drawings, in which.

EXAMPLES

Example 1 (Invention)

Figure 3A:
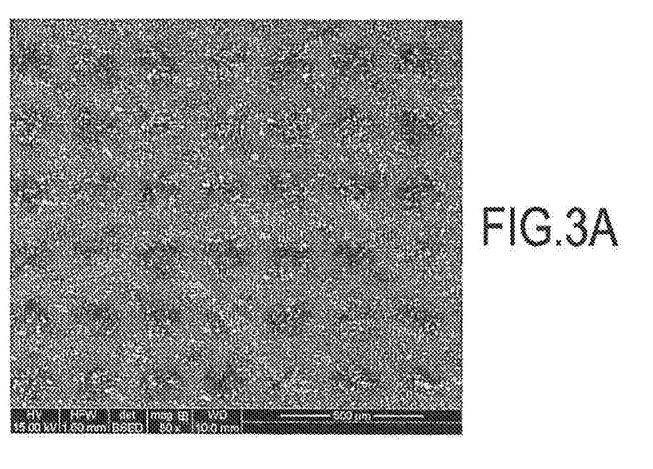
FIGS. 3A to 3C are photographs of a ceramic material obtained after performing a method of the invention.
Figure 3B:
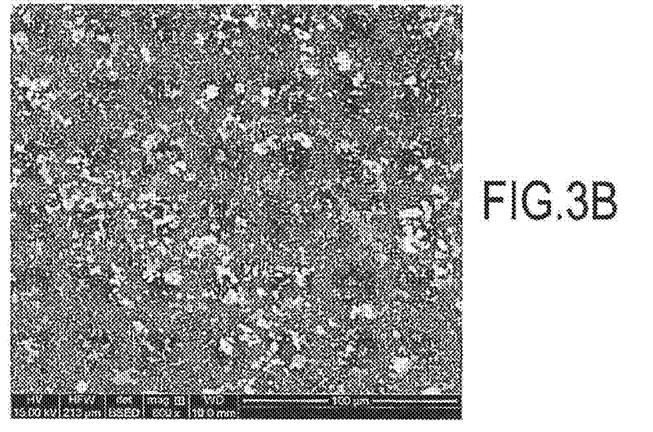
Figure 3C:
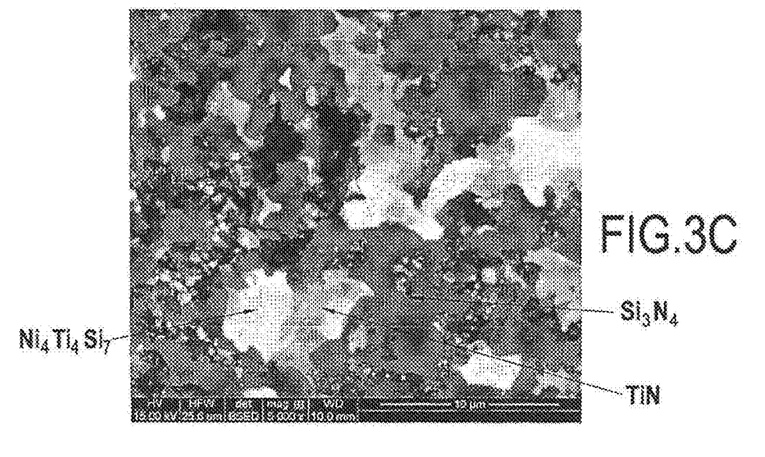
Figure 4:
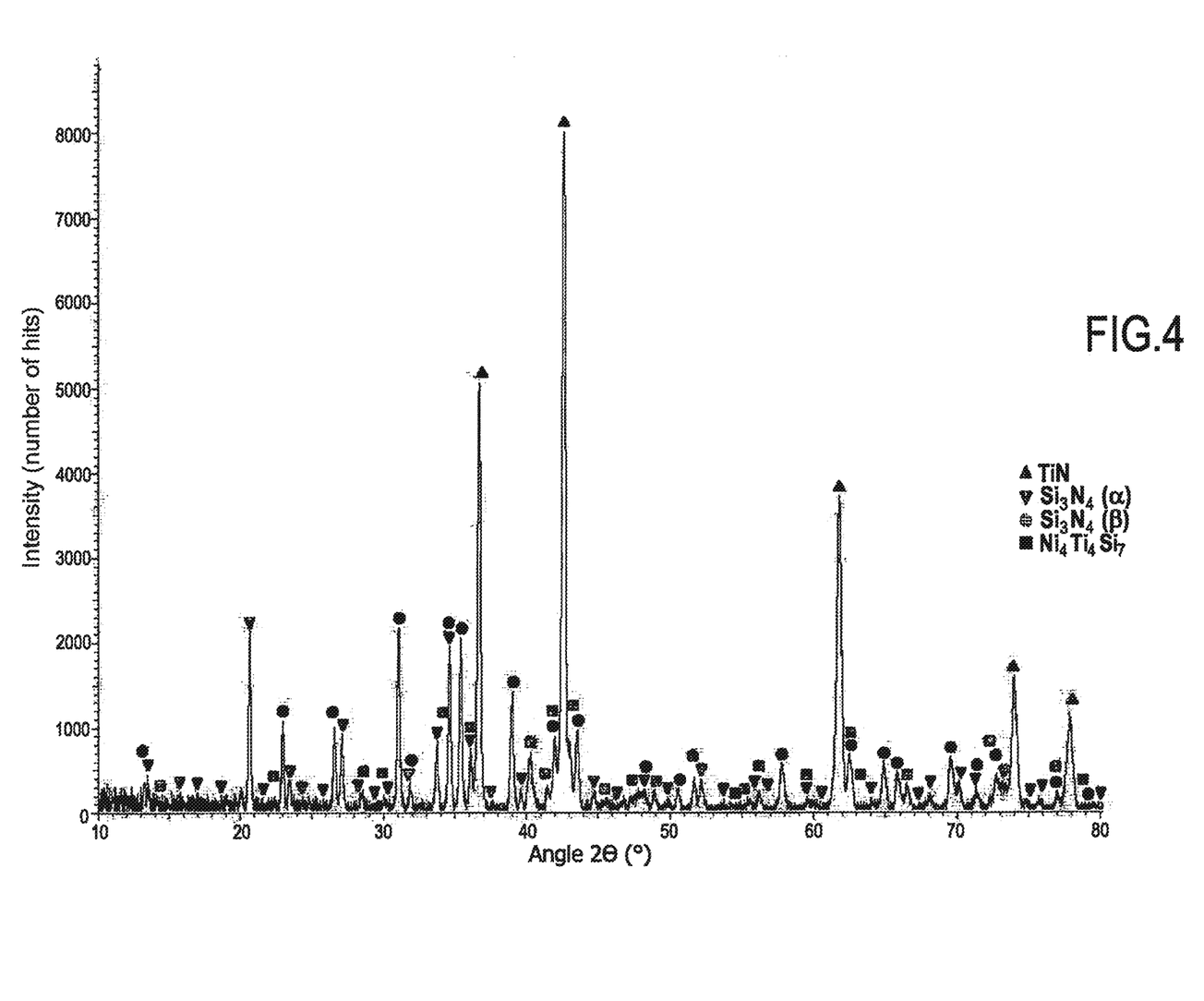
FIG. 4 is a XRD diagram of a ceramic material obtained after performing a method of the invention.

FIGS. 3A to 3C are photographs showing the material obtained after converting a sample having an initial composition of 90 at % $TiSi_2$+10 at % Ni by treatment under normal pressure with $N_2$ at 1100° C. for 40 hours (h). The phases present at the end of the treatment were TiN, $Si_3N_4$, and $Ni_4Ti_4Si_7$ (see FIG. 4). It should be observed that at the end of the treatment, free silicon and residual $TiSi_2$ were absent. This reaction was accompanied by an increase in volume of about 50%.

Figure 5A:
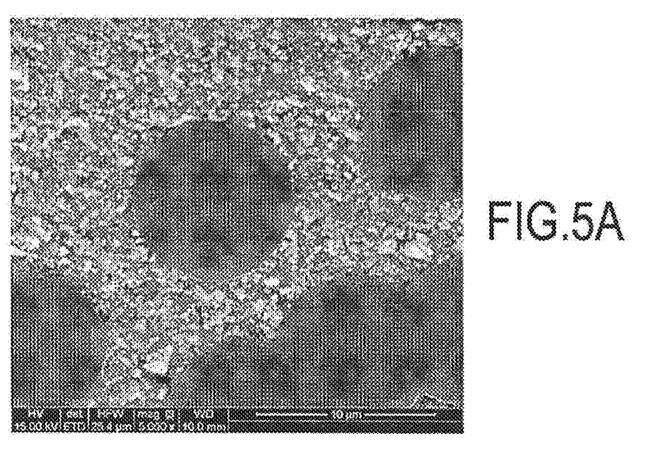
FIGS. 5A to 5C are photographs showing the fibers of a fiber preform, the interphase, and the matrix formed after performing a method of the invention for forming a ceramic matrix.
Figure 5B:
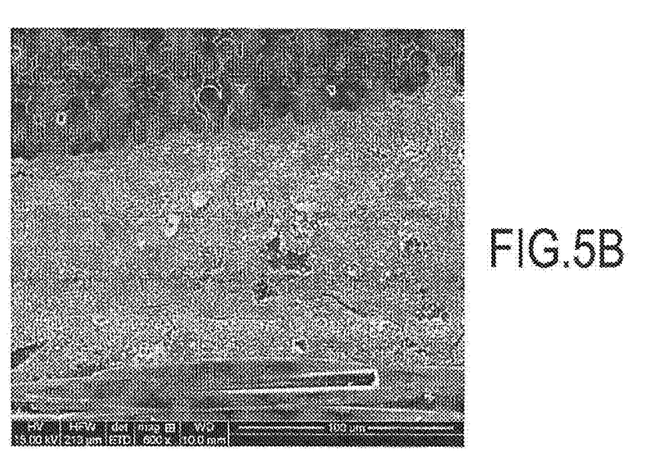
Figure 5C:
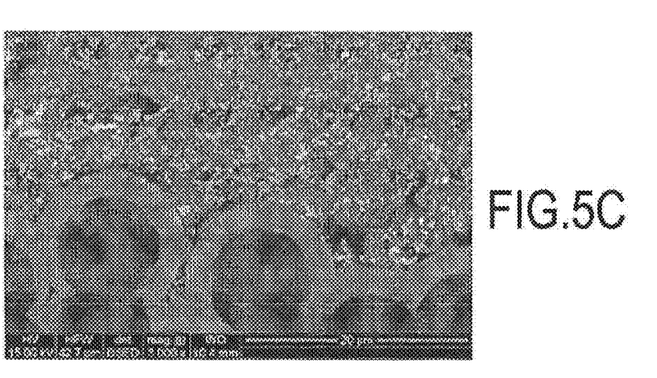

FIGS. 5B and 5C are photographs showing in particular a matrix obtained by converting an infiltrated powder ($d_{50}$=300 nanometers (nm)) having an initial composition of 90 at % $TiSi_2$+10 at % Ni treated under normal pressure with $N_2$ at 1100° C. for 40 h within a fiber preform. The phases formed were identical to those described above (TiN, $Si_3N_4$, and $Ni_4Ti_4Si_7$). No reaction was observable between the powder and the Nicalon® fibers coated in a PyC/SiC interphase.

Likewise, FIG. 5A also shows the absence of reaction between the powder and the interphase coated fibers when a preform of carbon fibers coated in a PyC interphase was treated under the same operating conditions.

The absence of reactivity, in particular of the liquid phase, can be attributed to the nitrogen atmosphere that tends to encourage nitriding. A part is thus obtained in which neither the fibers nor the interphase are degraded by the nitriding, together with a matrix that is dense and rigid with a microstructure that is uniform. It should also be observed that there is good adhesion between the interphase and the matrix.

Figure 6A:
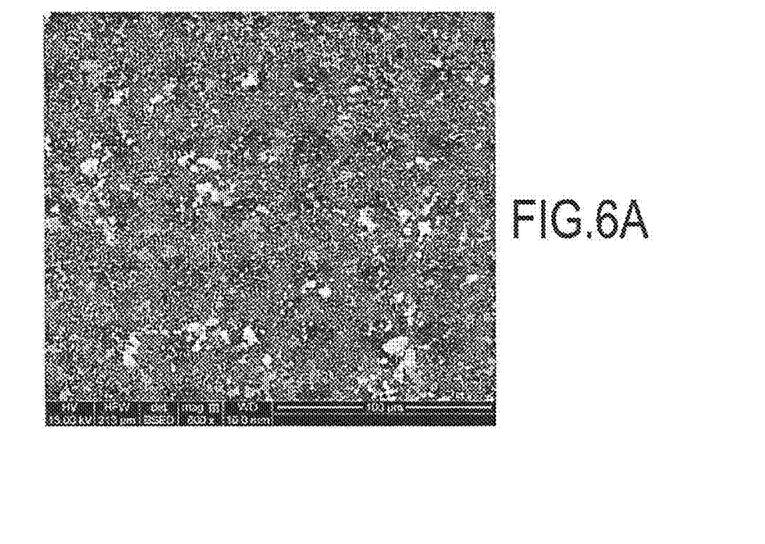
FIGS. 6A and 6B are photographs of a ceramic material obtained after performing a method of the invention.
Figure 6B:
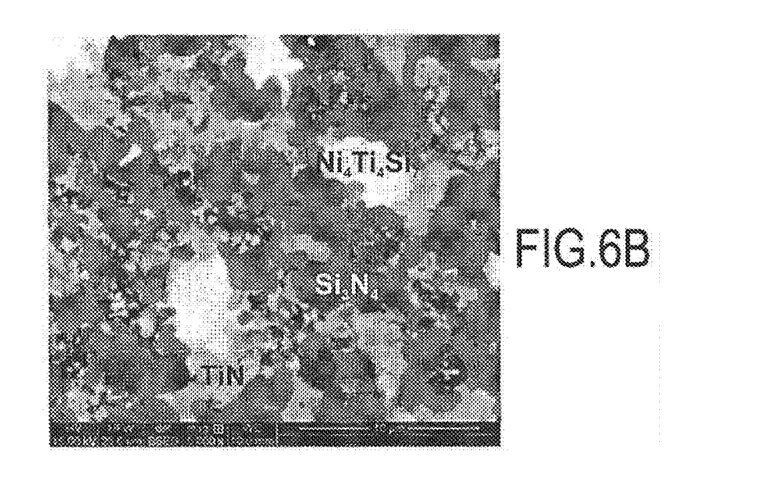

FIGS. 6A and 6B are photographs of ceramic matrices obtained after performing another example of a method of the invention using an initial atomic content of nickel in the mixture of 12.5%. A material was obtained that was hard, dense, and uniform, containing only TiN, $Si_3N_4$, and $Ni_4Ti_4Si_7$. In this example, the $Ni_4Ti_4Si_7$ was present at a molar content equal to 2%, a weight content equal to 14%, and a volume content equal to 10%.

Table 1 below lists the results obtained by using a TiSi$_2$+Ni system at 1100° C. for 40 h with N$_2$ in association with various concentrations of nickel.

TABLE 1

| Nickel content (% mol) | Theoretical volume gain (%) | Weight gain (%) Exp. (±2) | Weight gain (%) Th. | Nitrogen content (%) Exp. (±5) | Nitrogen content (%) Th. | Ni$_4$Ti$_4$Si$_7$ | TiN | Si$_3$N$_4$ | Free Si | TiSi$_2$ | NiSi/ NiSi$_2$ |
|---|---|---|---|---|---|---|---|---|---|---|---|
| 10 | 50.8 | 37.7 | 41.8 | 48 | 51.5 | X | X | X | | | |
| 12.5 | 48.6 | 38.1 | 39.7 | 50 | 50.4 | X | X | X | | | |
| 15 | 46.4 | 36.3 | 37.7 | 50 | 49.2 | X | X | X | | | |

These implementations lead to a reaction that is complete, forming TiN+Si$_3$N$_4$+Ni$_4$Ti$_4$Si$_7$. It should also be observed that impurities such as free silicon, TiSi$_2$, or NiSi/NiSi$_2$ were absent.

Example 2 (Comparative)

The results obtained by a method of the invention were compared with those obtained by a method not of the invention in which the second powder was not used. The non-invention method of obtaining the composite material and used in this comparative example is described below:
  impregnating TiSi$_2$ powder within a fiber preform;
  heat treatment under dinitrogen: nitriding reaction in order to form TiN and Si$_3$N$_4$.

Figure 7A:
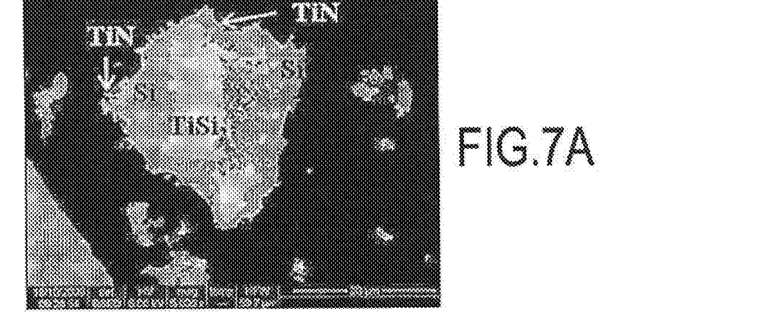
FIGS. 7A and 7B are photographs of a ceramic material obtained after performing a non-invention method.
Figure 7B:
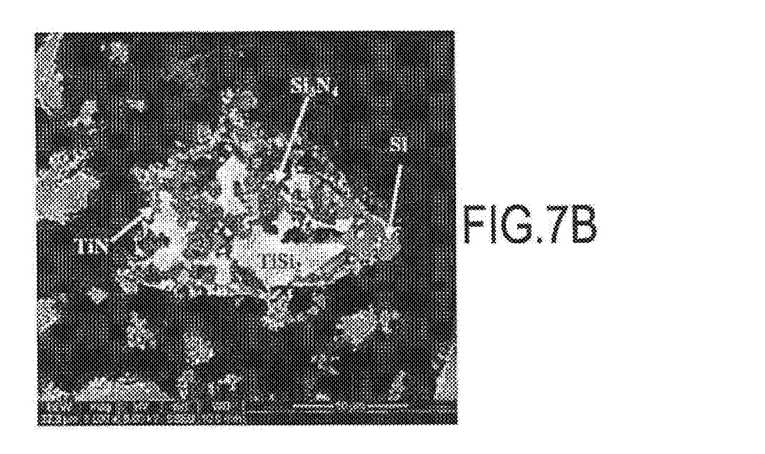

In order to avoid degrading the SiC (Nicalon®) fibers of the preform, the treatment temperature was limited to 1100° C. The results obtained for the non-invention test at a reaction temperature of 1100° C. are given in FIGS. 7A and 7B. At that temperature, the inventors have observed that the nitriding reaction was slow and incomplete because the formation of Si$_3$N$_4$ can be relatively difficult at temperatures less than or equal to 1100° C. The volume gain obtained was smaller and the presence of mechanically and chemically undesirable metallic silicon was observed.

Figure 8:
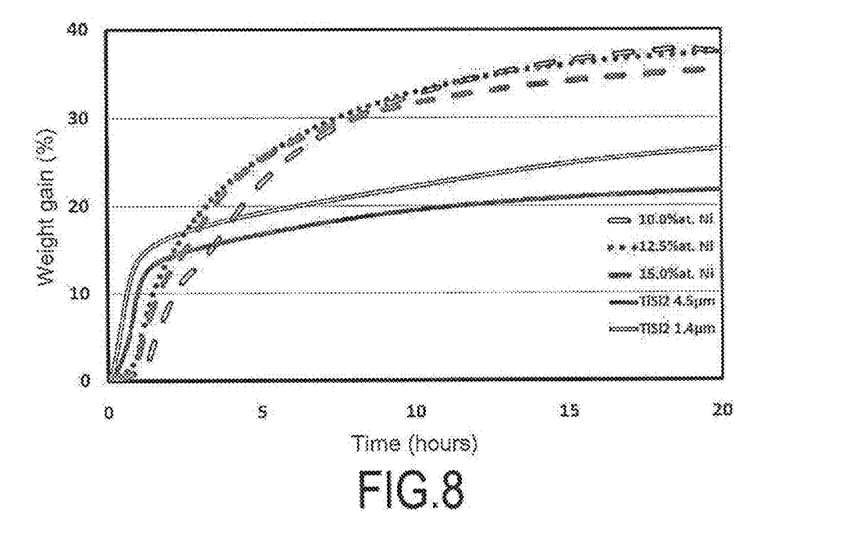
FIG. 8 shows thermogravimetric analysis measurements comparing the results obtained between methods of the invention and methods not of the invention.

FIG. 8 shows thermogravimetric analysis (TGA) measurements obtained after treatment at 1100° C. with N$_2$:
  of a mixture (100−x) at % TiSi$_2$+x at % Ni with x=10, 12.5, and 15 of nickel (invention); or
  of TiSi$_2$ alone: without using a second powder and without forming a liquid phase (non-invention).

It can be seen that the examples of the invention promote nitriding of silicon at a relatively low temperature of 1100° C. The nitriding of silicon is facilitated by the presence of the second powder of nickel that makes it possible to obtain a liquid phase that is rich in silicon around the grains. Adding nickel modifies and greatly increases transformation compared with systems not having nickel.

Example 3 (Comparative)

The non-invention method used in this comparative example corresponded to a method of nitriding in which the nickel powder usable in the context of the invention was replaced by an Ni$_3$Al powder. More precisely, the present comparative test evaluated the influence of adding 1% by volume of Ni$_3$Al as taught in the publication by Zhang et al. ("Influence of 1 vol % Ni$_3$Al addition on sintering and mechanical properties of reaction-bonded Si$_3$N$_4$", Journal of the European Ceramic Society 15 (1995) pp. 1065-1070) on the nitriding reaction of silicon.

A pellet comprising a mixture of a powder of silicon and of Ni$_3$Al at a content of 1% by volume was obtained. The pellet presented a diameter of 10 millimeters (mm) and a thickness of 3 mm. The pellet was treated with N$_2$ while imposing a temperature of 1100° C. as in Examples 1 and 2 above. The following results were obtained after 30 h of treatment:
  weight content of residual silicon: about 86.8%;
  weight content of αSi$_3$N$_4$: 11.6%; and
  weight content of βSi$_3$N$_4$: 1.6%.

The weight contents were determined by X-ray diffraction.

It can be seen that by using Ni$_3$Al in proportions as taught in the above-cited publication by Zhang et al., while imposing a relatively low working temperature of 1100° C., gave rise to a degree of advance in the nitriding reaction that was significantly smaller than that obtained by adding a powder of nickel in accordance with Example 1 of the invention.

Example 4

Pellets of ZrSi$_2$ were nitrided for 40 h under normal pressure of dinitrogen at a temperature of 1100° C.

When 10 at % of nickel were added to the mixture, and after 40 h of nitriding, the majority phases were ZrN and Si$_3$N$_4$. The presence of ZrSi$_2$, ZrSi$_2$Si, and NiZr was observed in the minority. The presence of free silicon was not observed.

Without adding nickel (not the invention), the majority phases were ZrN and ZrSi$_2$ after 40 h of nitriding. Si$_3$N$_4$ was detected, but it constituted a minority phase. Free silicon was also detected.

Adding nickel thus facilitated nitriding of the metallic disilicide ZrSi$_2$ even at a relatively low working temperature of 1100° C.

Example 5

Pellets of ZrSi$_2$ were nitrided for 40 h under normal pressure of dinitrogen at a temperature of 1100° C.

When a powder of AS13 alloy was added at 10 at %, and after 40 h of nitriding, the majority phases were ZrN, Si$_3$N$_4$, and ZrSi$_2$. The presence of a minimum quantity of free silicon was observed.

Without adding the AS13 powder, and after 40 h of nitriding, the majority phases were ZrN and ZrSi$_2$, with Si$_3$N$_4$, being observed in the minority. Free silicon was also detected.

Adding an aluminum alloy to the silicon thus facilitated nitriding the metallic disilicide ZrSi$_2$ even at a relatively low working temperature of 1100° C.

Example 6

Pellets of VSi$_2$ were nitrided for 40 h under normal pressure of dinitrogen at a temperature of 1100'C.

When an AS13 alloy powder was added at 10 at %, and after 40 h of nitriding, the majority phases were $VSi_2$, VN, and $Si_3N_4$. The presence of $V_{4.75}Si_3N_{0.58}$ was also observed in minimal quantity.

Without adding the AS13 powder, and after 40 h of nitriding, the majority phase was $VSi_2$, VN, $Si_3N_4$, and $V_{4.75}Si_3N_{0.58}$ were in the minority.

Adding an alloy of aluminum and of silicon thus facilitated nitriding the metallic disilicide $VSi_2$ even at a relatively low working temperature of 1100° C.

Example 7

The possibility of carburizing a mixture of $TiSi_2+10$ at % Ni at 1100° C. under normal pressure with methane was evaluated by simulation using ThermoCalc software. The results of the simulation revealed the formation of SiC, $Ti_3SiC_2$, and $Ni_4Ti_4Si_7$, and the absence of residual silicon or of $TiSi_2$.

The term "lying in the range . . . to . . ." should be understood as including the bounds.

The invention claimed is:

1. A method of fabricating a turbomachine element including a step of fabricating a ceramic material to form said turbomachine element, the ceramic material being fabricated by performing a method comprising
   forming the ceramic material by performing a first chemical reaction at least between a first powder of a metallic disilicide $MSi_2$ where M is a transition metal and a reactive gas phase, the first chemical reaction being a nitriding reaction and the reactive gas phase comprising the element N or the first chemical reaction being a carburizing reaction and the reactive gas phase comprising the element C, a liquid phase obtained from a second powder being present around the grains of the first powder during the first chemical reaction, a working temperature being imposed during the formation of the ceramic material, which temperature is low enough to avoid melting the first powder, and one of the two following characteristics being true:
      the second powder is a powder of nickel and the liquid phase is obtained as a result of a second chemical reaction between at least one element of the first powder and the nickel of the second powder, and when M is Ti, the ceramic material comprises a $Ni_4Ti_4Si_7$ phase, and is free of free silicon, $TiSi_2$ or$NiSi/NiSi_2$, or
      the second powder is a powder of an alloy of aluminum and of silicon AlSi13 comprising substantially 13% by weight silicon and the liquid phase is obtained by melting by said alloy of aluminum and of silicon.

2. A method according to claim 1, wherein the first powder is a powder of $TiSi_2$, a powder of $CrSi_2$, a powder of $ZrSi_2$, or a powder of $VSi_2$.

3. A method according to claim 2, wherein the first powder is a powder of $TiSi_2$ and the second powder is a powder of nickel.

4. A method according to claim 2, wherein the first powder is a powder of $ZrSi_2$ and the second powder is a powder of the alloy of aluminum and of silicon AlSi13.

5. A method according to claim 1, wherein, prior to beginning the first chemical reaction, the quantity of material of the first powder is greater than the quantity of material of the second powder.

6. A method according to claim 5, wherein, prior to starting the first chemical reaction, the following conditions are satisfied:
   the ratio of (the quantity of material of the first powder) divided by (the quantity of material of the first powder plus the quantity of material of the second powder) is greater than 0.825 and less than 0.925; and
   the ratio of (the quantity of material of the second powder) divided by (the quantity of material of the first powder plus the quantity of material of the second powder) is greater than 0.075 and less than 0.175.

7. A method according to claim 1, wherein the reactive gas phase comprises at least one of the following gases: $NH_3$, $N_2$, a gaseous hydrocarbon, or tetramethylsilane.

8. A method according to claim 1, wherein the working temperature is less than or equal to 1150° C. and/or the first chemical reaction is performed at a pressure lying in the range 3 mbar to 10 bar.

9. A method according to claim 1, wherein the turbomachine element is a ceramic matrix composite material part and wherein the ceramic material is formed in the pores of a fiber preform.

10. A method according to claim 1, wherein the turbomachine element is a ceramic material block.

11. A method according to claim 1, wherein the ceramic material forms a coating present on a surface of the turbomachine element.

12. A ceramic material essentially comprising TiN, $Si_3N_4$, and $Ni_4Ti_4Si_7$, and presenting a weight content of residual free silicon less than or equal to 1% the ceramic material obtained by carrying out a method comprising:
   forming the ceramic material by performing a first chemical reaction at least between a first powder of a metallic disilicide $MSi_2$ where M is a transition metal and a reactive gas phase, the first chemical reaction being a nitriding reaction and the reactive gas phase comprising the element N or the first chemical reaction being a carburizing reaction and the reactive gas phase comprising the element C, a liquid phase obtained from a second powder being present around the grains of the first powder during the first chemical reaction, a working temperature being imposed during the formation of the ceramic material, which temperature is low enough to avoid melting the first powder, the second powder being a powder of nickel and the liquid phase is obtained as a result of a second chemical reaction between at least one element of the first powder and the nickel of the second powder; and when M is Ti, the ceramic material comprises a $Ni_4Ti_4Si_7$ phase, and is free of free silicon, $TiSi_2$ or $NiSi/NiSi_2$.

13. A ceramic matrix composite material part comprising:
   fiber reinforcement; and
   a matrix present in the pores of the fiber reinforcement, the matrix comprising a ceramic material according to claim 12.

14. A turbomachine including a ceramic material according to claim 12.

15. A turbomachine including a part according to claim 13.

* * * * *